(12) United States Patent
Baumstimler

(10) Patent No.: US 7,828,351 B2
(45) Date of Patent: Nov. 9, 2010

(54) MANIPULATOR ROBOT TOOLS WITH RAMPS BEARING EQUIPMENT ITEMS FOR GRIPPING OBJECTS

(75) Inventor: Gilles Baumstimler, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 670 days.

(21) Appl. No.: 11/664,922

(22) PCT Filed: Oct. 19, 2005

(86) PCT No.: PCT/FR2005/002586

§ 371 (c)(1), (2), (4) Date: May 8, 2007

(87) PCT Pub. No.: WO2006/042961

PCT Pub. Date: Apr. 27, 2006

(65) Prior Publication Data
US 2008/0093872 A1    Apr. 24, 2008

(30) Foreign Application Priority Data
Oct. 20, 2004    (FR) .................................. 04 11136

(51) Int. Cl.
*B25J 15/06* (2006.01)
(52) U.S. Cl. ........................... 294/2; 294/65; 294/87.1; 198/468.4

(58) Field of Classification Search ...................... 294/2, 294/65, 87.1, 119.1, 62; 901/30, 39; 414/749.5, 414/751.1, 752.1; 198/468.3, 468.4
See application file for complete search history.

(56) References Cited

U.S. PATENT DOCUMENTS

| 3,973,795 | A | * | 8/1976 | Goransson | 294/65 |
| 4,482,289 | A | * | 11/1984 | Inaba et al. | 414/736 |
| 4,685,714 | A | * | 8/1987 | Hoke | 294/81.2 |
| 4,832,180 | A | * | 5/1989 | Ferrero | 198/468.3 |
| 5,018,776 | A | | 5/1991 | Trygg et al. | |
| 5,135,276 | A | * | 8/1992 | Blatt et al. | 294/65 |
| 6,371,717 | B1 | * | 4/2002 | Grams et al. | 414/416.09 |
| 6,863,323 | B2 | * | 3/2005 | Neveu | 294/65 |
| 7,134,833 | B2 | * | 11/2006 | de Koning | 414/753.1 |

FOREIGN PATENT DOCUMENTS

WO    WO 95/01908 A1    1/1995

* cited by examiner

*Primary Examiner*—Dean J Kramer
(74) *Attorney, Agent, or Firm*—Sughrue Mion, PLLC

(57) ABSTRACT

A manipulator robot for handling objects and in particular bottles. The manipulator robot includes a body whereon are fitted equipment items for gripping the bottles and the lower part of the body includes slide-shaped devices connecting the body and elongated support members whereon is arranged the equipment items. Fast fixing devices are also interposed between the body and each elongated support member to facilitate changing the elongated support members. The elongated support members may include all sorts of equipment items such as pneumatic bell-shaped gripping heads or handling suckers and/or claw systems for handling cartons.

16 Claims, 4 Drawing Sheets

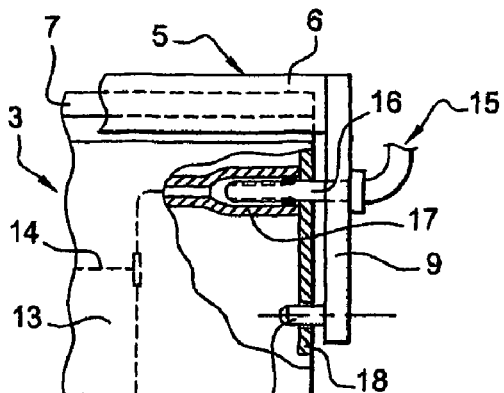
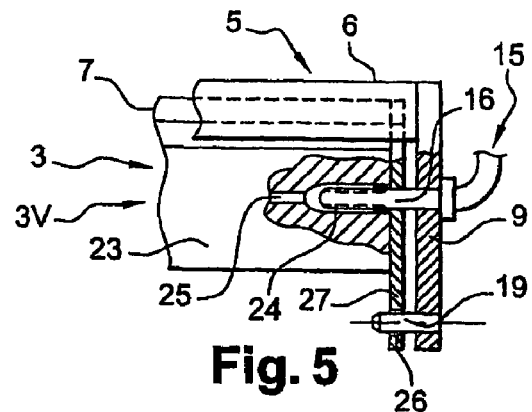
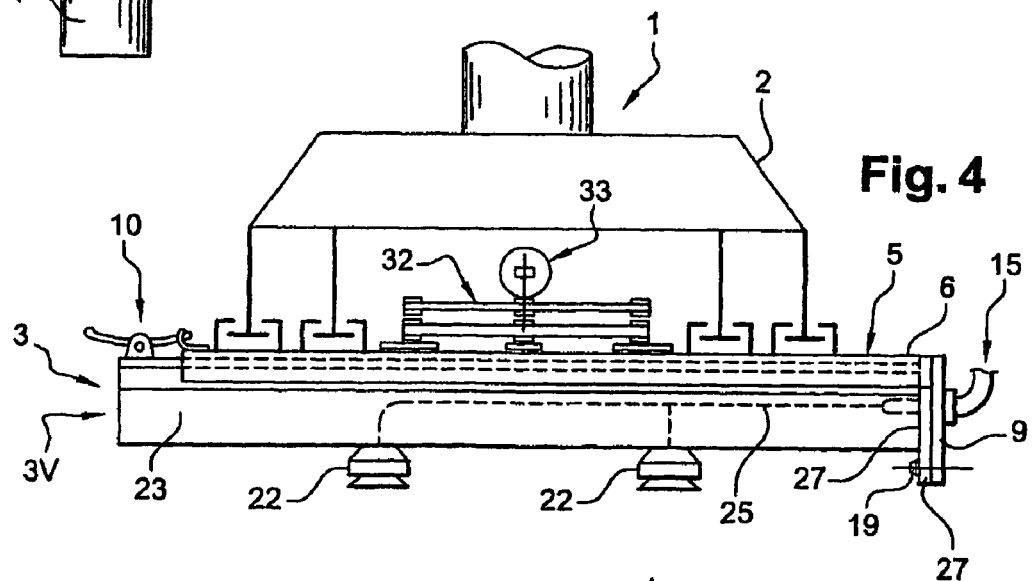
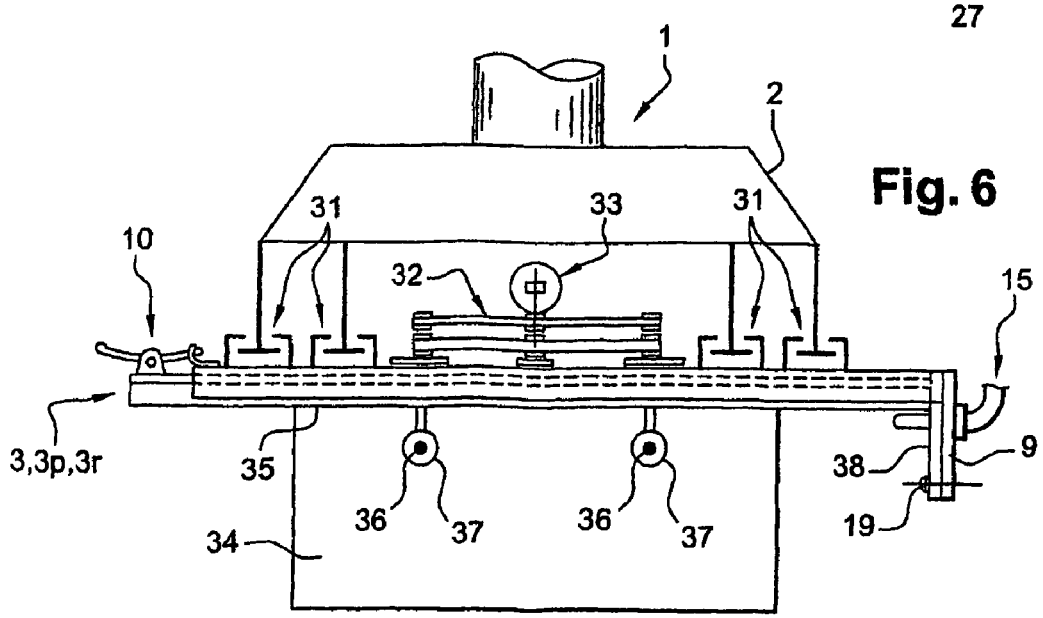

MANIPULATOR ROBOT TOOLS WITH RAMPS BEARING EQUIPMENT ITEMS FOR GRIPPING OBJECTS

The present invention relates to an improvement to manipulator robot tools and, more particularly, the tools used to pick up, move and transfer objects of all sorts in installations for the preparation and packaging or repackaging of these objects.

The tools of these robots are generally assigned to a clearly defined task, unchanging over time, and they are therefore not very suitable, lacking flexibility, for the operations that may be encountered in certain cases and which may be extremely varied.

Thus, for example, this problem of flexibility is encountered in the field of repackaging objects such as bottles, which are sometimes mass-prepared and packaged for delivery to central purchasing facilities, but which must then be repackaged in smaller batches for retailers.

The bottles are handled by a robot whereof the tool comprises a large number of gripping heads, and these heads are generally selected according to the type of bottles to be handled. The distribution of heads on the tool also depends on the packaging scheme planned for these bottles.

To contend with the variations in shape and size of the bottles or with the various packaging schemes, that is, the arrangement of the bottles with respect to one another during the secondary packaging, it is very often necessary to replace the tool, implying the permanent availability of a stock of tools adapted to the various schemes.

The operation whereby a tool is replaced on a manipulator robot is not a simple operation because these tools are relatively heavy, weighing about 150 to 400 kg or more. This operation employs large scale resources. It may be performed automatically, with appropriate handling means, or it may also be performed manually and, in this case, it requires the action of at least one operator with the use of a forklift truck.

The same difficulties associated with the handling of the tool recur for simple maintenance or upkeep operations on these tools and particularly for operations on the gripping heads.

To overcome these difficulties, the tool may be divided, as described in document U.S. Pat. No. 5,018,776, into several parts: a massive fixed part forming a frame, and, associated with this frame, demountable elements, which comprise built-in gripping heads.

The present invention proposes an improvement to manipulator robot tools, which not only helps to overcome the problems described above, but which also serves to impart to the tool a genuine versatility which meets the concern for flexibility. It also serves to make the maintenance operations and all handling operations associated with the replacement of the gripping heads less complicated and more rapid, and this is also valid in the context of a change of type of production, with, for example, the implementation of a new packaging scheme. All the operations pertaining to the tool are thereby simplified.

According to the invention, the tool comprises a body to which are fitted attachments which are suitable for the operations to be conducted, such as, for example, gripping attachments, said body comprising, in its lower part, slide-shaped means which are inserted between said body and elongated support members which carry said attachments, said slides are parallel to one another and consist of fixed rails connected to said body, each of these rails being equipped with groove-like assembly means for accommodating another rail which is mobile with respect thereto, having a complementary shape, located in the upper part of each of said elongated support members, and these pairs of fixed and mobile rails are equipped with means for quickly connecting each elongated support member to the body, said connecting means consisting, on the one hand, of a heel placed at the back of the fixed rail of said body, said heel forms a stop for the longitudinal wedging of the mobile rail and of the corresponding elongated support member and, on the other hand, at the front, these connecting means consist of a quick connection inserted between the rail of said elongated support member and said fixed rail, said quick connection is, for example, of the type commonly called: lash cleat.

This dissociation of the elongated support members from the tool body serves to simplify all the operations consisting in replacing the type of gripping head, for example. Each elongated support member can be handled individually and its weight is sufficiently low for an operator to take direct action without the help of a forklift truck.

According to another arrangement of the invention, the elongated support member has the shape of a caisson which comprises, in its upper part, the mobile rail of the slide system and, in its lower part, a conventional gripping attachment consisting of bell-shaped, pneumatically actuated heads, said caisson containing the various lines and connection and feed members of said heads.

According to an alternative of the invention, the elongated support member has the shape of a bar made from a synthetic material, machined in its upper part to form the rail of the slide system and machined in its mass to constitute the channels for feeding attachments such as suckers, or others, said suckers being placed at the lower part of said bar.

Also according to the invention, a quick coupling device for the pneumatic air feed to the gripping heads or suckers, is inserted between the back end face of the elongated support member and the heel of the fixed rail of the body, said heel having the shape of a genuine wall arranged squarely at the end of said fixed rail.

According to another alternative of the invention, elongated support members may comprise arrangements for producing a claw system, each arrangement consisting, for example, of a plate installed on a elongated support member, acting as a jaw, said plate may also comprise rod-like means forming a sort of bracing and reinforcement for said jaws, in cooperation with bearing-like means placed on the adjacent elongated support member.

According to a further arrangement of the invention, wedging means for maintaining the elongated support member in a vertical plane are inserted between the end of each elongated support member and the heel located at the end of the fixed rail of the body, said means are positioned at the lower part of said heel and consist of a centering pin placed, for example, on said heel, cooperating with an orifice made in said end of said elongated support member.

Also according to the invention, each elongated support member may comprise, on its sides, orifices placed in its front part and in its back part, for storing it by hooking on horizontal support arms, and it may also comprise handles placed between said hooking orifices, to facilitate its handling.

The invention further relates to the installation which comprises the type of tool described above, and in particular the bottle repackaging installation comprising —at least one loading station, supplied by at least one line for introducing pallets, or other items, containing bottles to be repackaged, —at least one line for transit or removal of said pallets, or other items, —at least one line for conveying and storing the pallets or crates suitable for receiving the repackaged bottles, —at least one line for removing the pallets or crates containing newly packaged bottles, and at least one palletizing station, —a manipulator robot equipped with at least one mobile tool for handling all said stations and said lines, —means for storing the elongated support members having the shape of a magazine, for making said elongated support members available to the operator close to the tool, said magazine consisting of a frame mountable on rollers, said frame is equipped with a central panel-shaped structure which carries horizontal arms arranged in pairs at several levels for accommodating said elongated support members.

However, the invention is given in greater detail using the following description and the drawings appended hereto, provided for information and in which:

FIG. 3 shows, in greater detail, the assembly and connection at the end of a elongated support member to the heel of the rail which is fixed to the tool body;

FIG. 4 shows a tool which is shown schematically and more completely, in a side view, and said tool is equipped with another type of elongated support member such as, for example, the attachment consisting of suckers;

FIG. 5 shows, in greater detail, the end of the elongated support member shown in FIG. 4, heel side;

FIG. 6 shows an identical tool to the one in FIG. 4, equipped with elongated support members which are arranged to perform crate gripping operations, for example;

Figure 1:
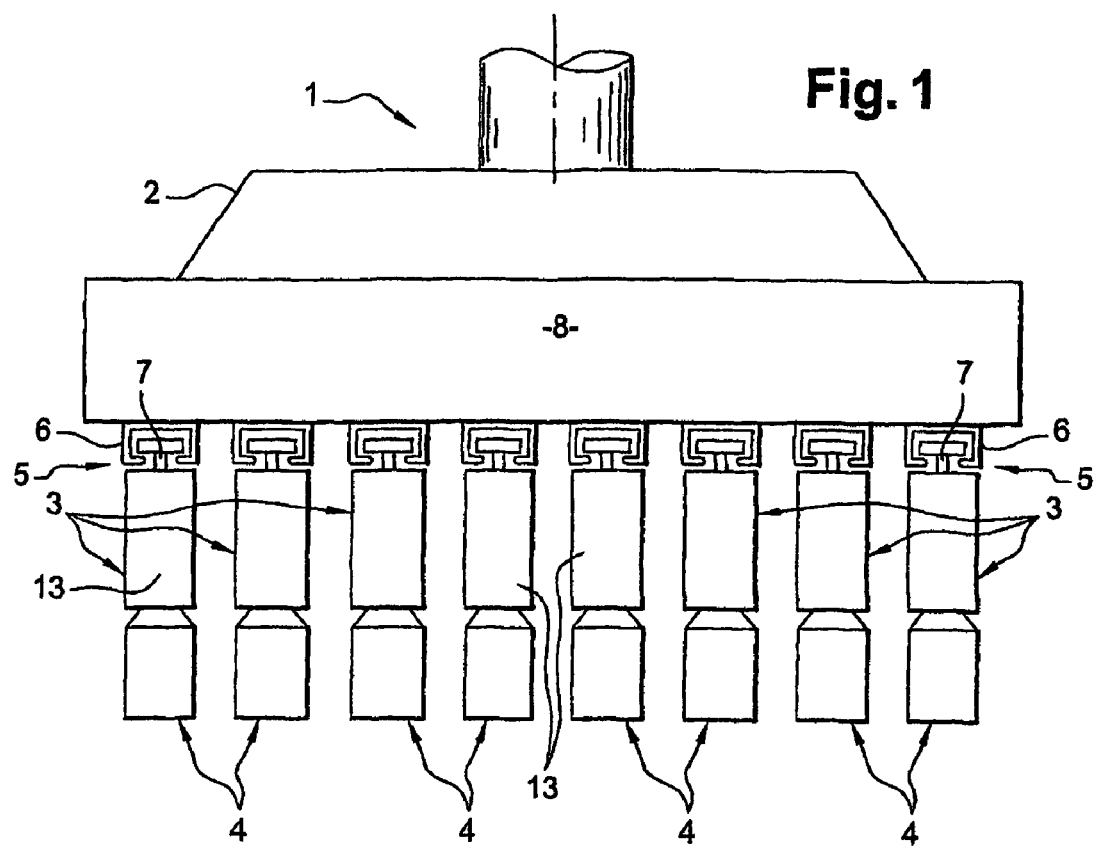
FIG. 1 is a simplified frontal elevation view of a tool with elongated support members fitted with bell-shaped gripping heads.

As shown in FIG. 1, the tool (1) comprises a body (2) which can be structured with conventional arrangements conferring particular functions thereto. These arrangements and functions are given in greater detail below in the description as the need arises.

In FIG. 1, the tool (1) comprises elongated support members (3) extending below the body (2), and said elongated support members (3) comprise, in their lower part, bell-shaped, pneumatically actuated heads (4), for gripping bottles, not shown.

Particular means are inserted between the body (2) and each elongated support member (3) for their assembly. These means consist of a slide system (5) whereof part, in the form of a fixed rail (6), is connected to the body (2) and whereof the other part, also in the form of a rail (7), but mobile, is placed on each elongated support member (3) at its upper part. The rail (6) comprises for example a groove and its C-shaped section extends horizontally; the rail (7) of the elongated support member (3) has a complementary shaped section; this section is a recumbent H-shape or a tee shape.

Figure 2:
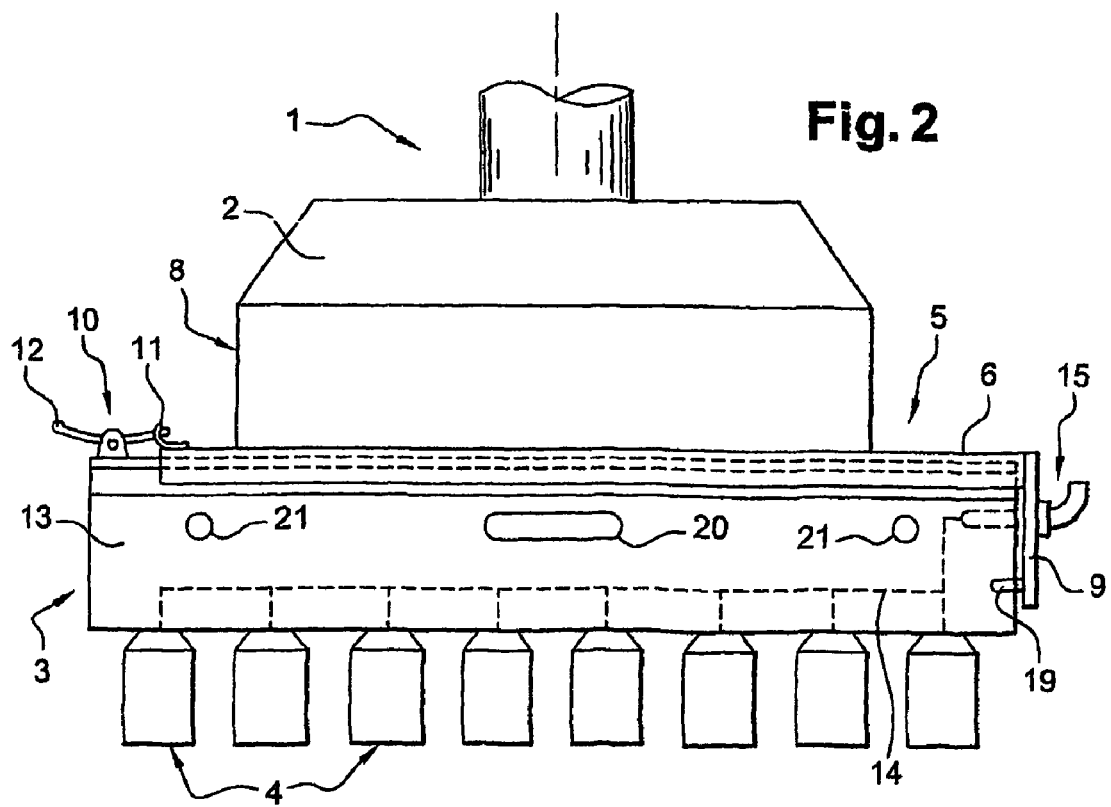
FIG. 2 shows the tool in a side view, with the same elongated support members as in FIG. 1.

These elongated support members (3) are inserted via the front (8) of the tool and are immobilized with regard to the body (2) by means of a connecting system which comprises, as shown in FIG. 2, —a heel (9) located at the back end of the fixed rail (6) which acts as a stop and, —a lash cleat-like quick connection (10), located at the front end of said rail (6). This quick connection (10) comprises a hook (11) fixed to the front end of the rail (6) and a handle (12) placed on the front end of the mobile rail (7) of the elongated support member (3).

An operator can therefore very rapidly perform the demounting of the elongated support members (3) by a simple unclipping of the quick connection (10) located at the front of the tool and by extracting said elongated support members (3) by sliding using the slide system (5).

Each elongated support member (3) has the shape of a caisson (13) extending between the slide system (5) and the series of heads (4). This caisson (13) contains the lines (14) for supplying compressed air to the various gripping heads (4). These lines (14) are connected to the compressed air source via a quick coupling (15) located on the back end side of the elongated support member (3). This connection is shown in greater detail in FIG. 3. The fixed part (16) of the quick coupling (15) is installed on the heel (9) and its mobile part (17) is installed on the end of the caisson (13), on its wall (18).

To obtain a perfect positioning of the elongated support members (3), in the vertical plane, and their complete immobilization, the heel (9) of each rail (6) is prolonged towards the lower part of the caisson (13). This heel (9) forms a genuine wall and comprises means for wedging the elongated support member (3) with which it cooperates. These wedging means consist of a pin (19) installed, for example, in the heel (9), at its lower part, and said pin cooperates with an orifice made in the end wall (18) of said caisson.

To facilitate the handling of the elongated support members (3), handles (20) are provided in the sides of the caissons (13). These handles are placed between the orifices (21) passing through each caisson (13), said orifices (21) being placed at each upper end of said caisson (13) and serving to suspend the elongated support members (3) in a magazine described below in greater detail in connection with FIG. 11.

FIG. 4 shows a tool (1) equipped with another form of elongated support member (3). This alternative elongated support member, also denoted (3v), comprises suckers (22) suitable for performing other operations with the tool (1). The suckers (22) are installed on the bottom side of the elongated support member (3v), said elongated support member (3v) having the shape of a bar (23) made from a synthetic material, for example, and it comprises at its upper part a rail (7) obtained by machining said bar (23), said rail (7) cooperates with the fixed rail (6) which is connected to the body (2) of the tool.

The back end of the elongated support member (3v) is shown in FIG. 5 in greater detail; the supply system of the suckers (22) is identical to the one used for the elongated support members (3) fitted with gripping heads (4). The quick coupling (15) comprises the same fixed part (16) which is connected to the heel (9). This fixed part (16) cooperates with a bore (24) made in the mass of the bar (23) and this bore (24) is prolonged by a drilled duct (25) which communicates with the suckers (22) to place them under vacuum.

Also at its back end, the elongated support member (3v) comprises an orifice (26) which cooperates with the pin (19) to wedge said elongated support member in the vertical plane. This orifice (26) is made in a heel (27) which projects from the bottom of the bar (23); this heel (27) may be part of said bar (23), of the same piece, or, as shown in FIGS. 4 and 5, may be added on and fixed by any appropriate means to the end thereof.

The tool (1), thanks to its slide system (5), can thereby combine elongated support members equipped with various types of attachments, suitable for the operations required. These attachments may be different from one another for certain types of operation, as shown in FIGS. 7 and 8.

Figure 7:
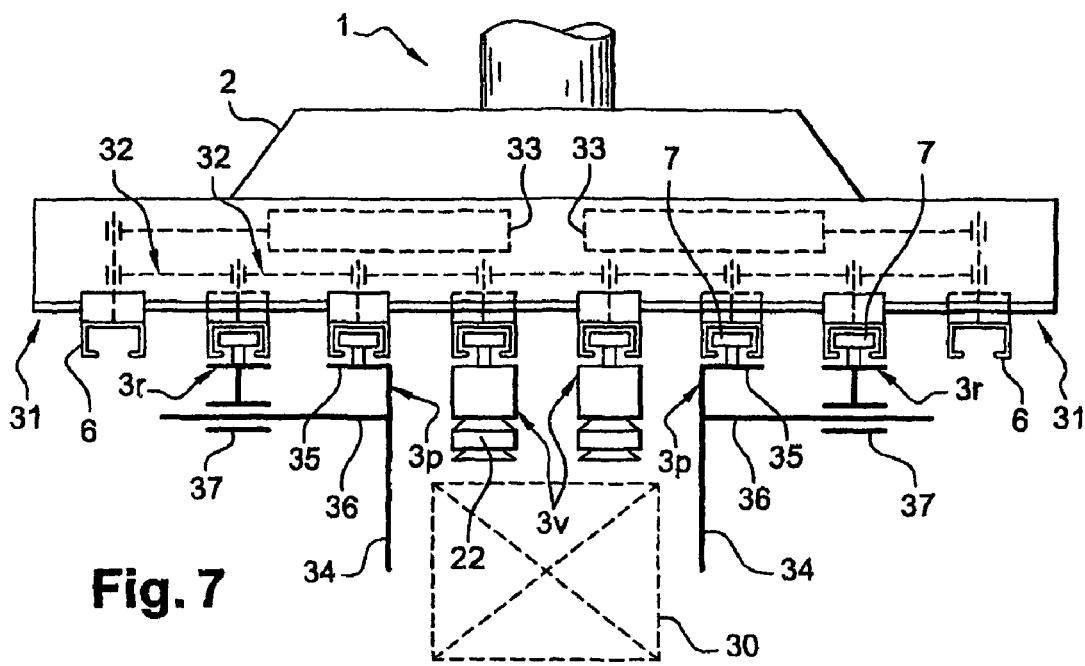
FIG. 7 shows, in a front view, a tool equipped, on the one hand, with two elongated support members with suckers as shown in FIG. 4 and, on the other hand, elongated support members shown in FIG. 6, said tool being in an inactive position facing a crate.
Figure 8:
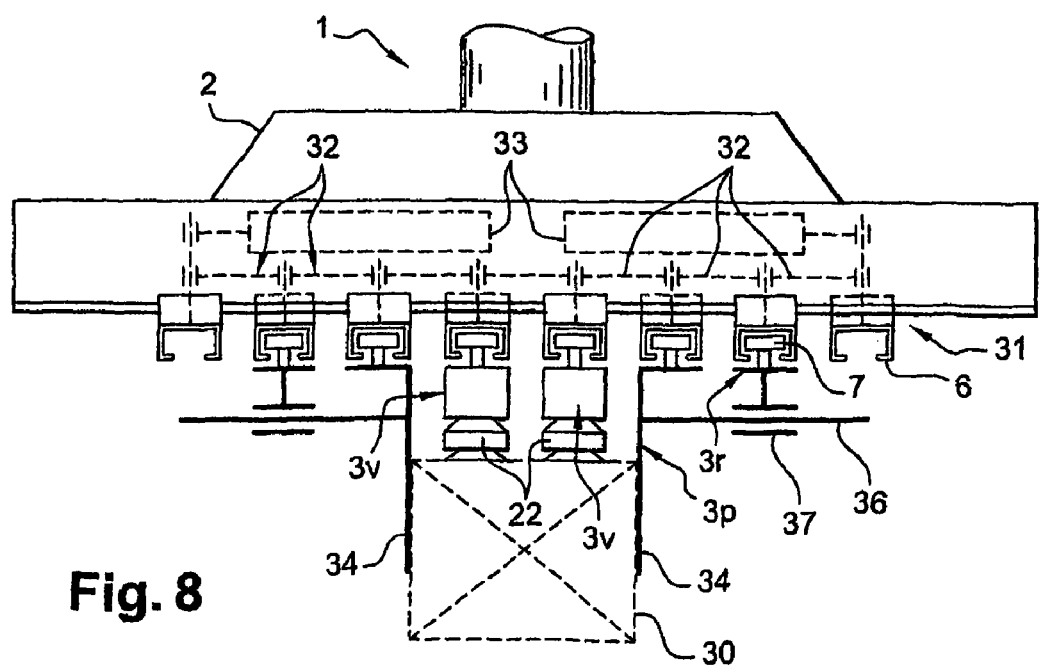
FIG. 8 shows, also in a front view, the tool in FIG. 7 in an active position of gripping the crate.

In these FIGS. 7 and 8, the tool (1) comprises elongated support members (3v) of the sucker type and a system of claws, for handling one or more crates (30). The claw system itself consists of several elongated support members (3): —two elongated support members (3p) forming jaws and two elongated support members (3r) associated with same, forming reinforcements for said jaws.

FIG. 6 shows a side view of the claw system with the elongated support member (3p) and the elongated support member (3r) discussed in greater detail below.

In FIG. 7, the tool is shown in the inactive position facing a crate (30) whereas in FIG. 8, the same tool is shown in an active position of gripping said same crate (30).

This handling of the crates (30) is feasible thanks to the arrangement of the tool (1) which comprises means for simultaneously separating all the rails (6) and keeping them parallel to one another and always with the same spacing. These means are not part of the invention but they serve to take advantage thereof; they are shown very schematically in the figures and particularly in FIGS. 4, 6, 7 and 8.

The means for modifying the spacing of the rails (6) consist of slide systems (31) placed across and inserted between the body (2) and said rails (6). These rails (6) are also connected together by means of a compass-like mechanism (32) serving to maintain the same spacing between said rails (6), said spacing being changed at will using two cylinders (33) each acting on said rails (6) placed laterally, at the ends of the body (2) of the tool (1).

The claw system can operate thanks to this particular arrangement of the tool (1) which enables the elongated support members (3p) to form a sort of vice. These elongated support members (3p) have the shape of a plate (34) whereof the upper part is provided with a horizontal fold (35), positioned squarely, to which the rail (7) is fixed.

To prevent the distortion of the plates (34) which constitute jaws, these plates (34) comprise stiffeners formed of rods (36) which make a sort of bracing; each rod (36) extends horizontally, perpendicular to its plate (34), and is guided in a bearing (37) arranged on the elongated support member (3r) in order to slide during the separation of the rails (6).

This elongated support member (3r) simply consists of a rail (7) which supports the bearings (37) serving as guides for the rods (36), as shown also in FIG. 6.

The elongated support members (3p) and (3r) form a pair and are installed simultaneously in their respective rails (6). They are immobilized in the rails (6) like the elongated support members described above in detail with lash cleat-like quick connection means (10) and are also maintained in a vertical plane using the pin (19) installed on the heel (9), said pin (19) cooperating with a projecting part (38), installed on the back part of the elongated support members (3p) and (3r), FIG. 6.

Figure 9:
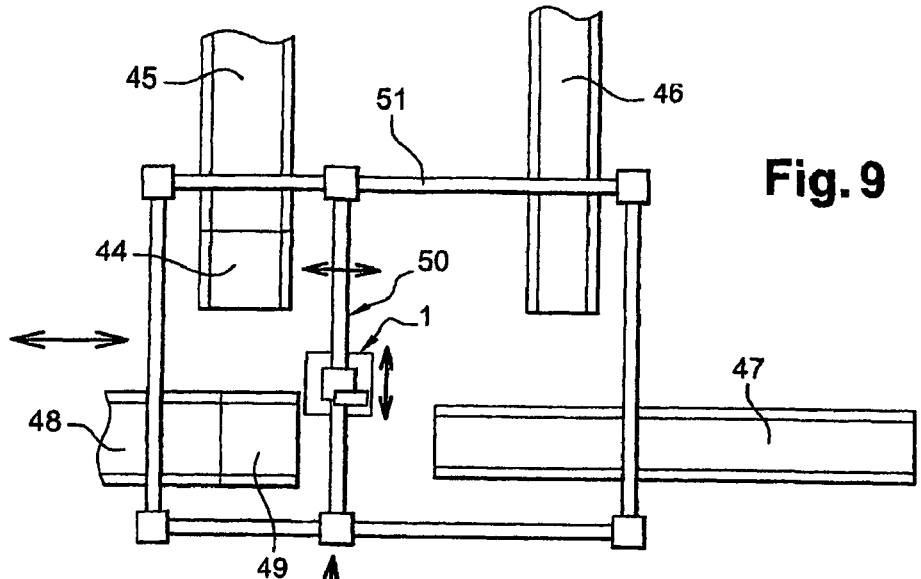
FIG. 9 shows a repackaging installation, for example, using a versatile tool of the invention.

FIG. 9 schematically shows a bottle packaging or repackaging installation, for example. This installation comprises: —a bottle loading station (44) and a line (45) whereby are introduced the pallets or other items containing said bottles or batches of bottles to be repackaged, —at least one line (46) for transit or removal of said pallets or other items when they are empty, —at least one line (47) for conveying and storing the pallets or crates intended to receive the repackaged bottles or batches, —at least one line (48) for removing the pallets or crates of newly packaged bottles and at least one palletizing station (49), —a manipulator robot (50) whereof the tool (1) is installed on a gantry (51) for handling all the stations or lines described above, said manipulator robot (50) comprising a tool (1) such as the one described above, which travels above the stations (44, 49) and above the lines (45) to (48).

Figure 10:
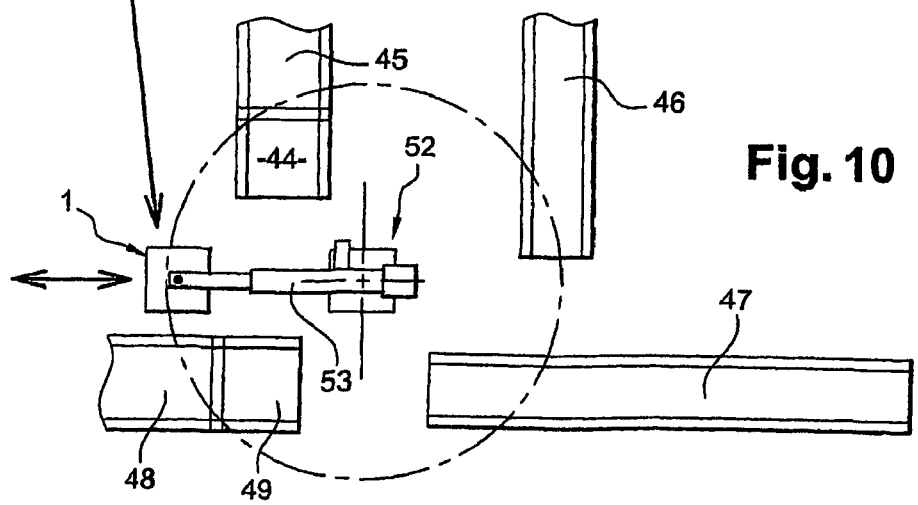
FIG. 10 shows an alternative repackaging installation.

An alternative of this installation is shown in FIG. 10; it differs in the fact that the manipulator robot (52) comprises an arm (53) which moves about a vertical axis. This arm (53) comprises at its end a tool (1) as described previously, also traveling above the various stations (44), (49) or the lines (45) to (48).

To enable the operator to take action rapidly at the tool (1) to alter its configuration, he is provided with one or more movable magazines (60); each magazine is, for example, arranged to contain at least one set of elongated support members (3) intended for installation on said tool (1). The ability to place this magazine (60) immediately next to the tool (1) helps the operator to save time and reduces the fatigue caused by these operations.

Figure 11:
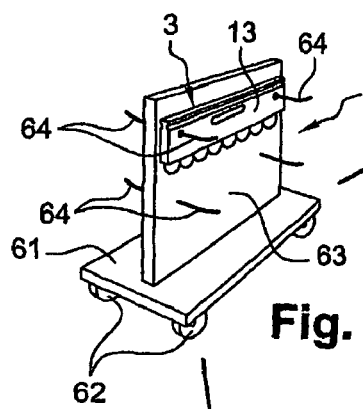
FIG. 11 shows a elongated support member storage device, suitable for positioning close to the robot of one or the other of the installations in FIGS. 9 and 10, facilitating the operator's work.

This magazine (60) is shown schematically in FIG. 11, on a larger scale than that used to show the two installations in FIGS. 9 and 10. It consists of a frame (61) which can be mounted on rollers (62), said frame being equipped with a central panel-shaped structure (63) comprising arms (64). These arms (64) are perpendicular to the panel (63); they extend horizontally and are placed at several levels, in pairs, to accommodate the elongated support members (3). These elongated support members (3) are hooked to the arms (64) by means of orifices (21) made in the caissons (13).

The elongated support members (3) may also comprise attachments other than bottle gripping heads. They may also be equipped with claws, suckers as described in detail above, etc., imparting considerable versatility to the tool (1).

These elongated support members (3p), (3r) can be stored in the same way on the arms (64) of the magazine (60).

The invention claimed is:

1. A manipulator robot tool for picking up and moving objects, said tool comprising a body to which are fitted attachments for gripping said objects, elongated support members which carry said attachments, and slides inserted between said body and said elongated support members, said slides parallel to one another and comprising fixed rails connected to said body, each fixed rail comprising assembly means for accommodating a mobile rail and located in an upper part of each of said elongated support members, the tool further comprising means for quickly connecting each elongated support member to said body; each elongated support member has a shape of a caisson extending between the corresponding slide and corresponding ones of said gripping attachments, each of said gripping attachments comprising a bell-shaped, pneumatically actuated head, said caisson comprising compressed air supply lines for supplying compressed air to the gripping attachments, the supply lines connected to a compressed air source via a quick coupling located on a back end side of the elongated support member.

2. The manipulator robot tool as claimed in claim 1, wherein each elongated support member has a shape of a bar and is made from a synthetic material, machined in an upper part of the elongated support member to form the mobile rail of the respective slide and further comprises a drilled duct for attachment suckers, said suckers placed at a lower part of the elongated support member.

3. The manipulator robot tool as claimed in claim 1, wherein the quick coupling is inserted between a back end face of the elongated support member and a heel of the fixed rail to provide a pneumatic air supply, said heel having the shape of a wall arranged squarely at the end of said fixed rail.

4. The manipulator robot tool as claimed in claim 1, comprising a compass mechanism for changing the spacing of the fixed rails, and wherein each of the elongated support members is fitted with arrangements for producing a claw system, said arrangements comprising a plate installed on one of the elongated support members, acting as a jaw, said plate comprising a rod forming a bracing in cooperation with a bearing on an adjacent one of the elongated support members.

5. The manipulator robot tool as claimed in claim 1, comprising means for wedging each elongated support member in a vertical plane with regard to its rail, said means for wedging inserted between an end of said elongated support member and a lower part of a heel of said fixed rail.

6. The manipulator robot tool as claimed in claim 5, wherein said means for wedging comprises a pin placed on said heel and cooperating with an orifice made in said end of said ramp.

7. A bottle repackaging installation comprising:
at least one loading station and one line for introducing pallets, or other items, containing the bottles to be repackaged,
at least one line for transit or removal of said pallets, or other items, when empty,
at least one line for conveying and storing the pallets or crates suitable for receiving the repackaged bottles or batches,
at least one line for removing the pallets or crates containing the repackaged bottles, and at least one palletizing station,
one robot for manipulating the bottles, said robot comprising a tool as claimed in claim 1,
a device that stores the elongated support members of said tool having the shape of a magazine, for making said elongated support members available to the operator close to said tool, said magazine comprising a frame mountable on rollers, said frame equipped with a central panel-shaped structure which carries horizontal arms arranged in pairs at several levels, said arms being suitable for accommodating said elongated support members.

8. The manipulator robot tool as claimed in claim 1, wherein the means for quickly connecting each elongated support member to said body comprises, on the one hand, a heel placed at a back of the fixed rail, the heel forming a stop for the longitudinal wedging of the corresponding mobile rail and, on the other hand, at a front, a quick release connection between the mobile rail and the fixed rail.

9. The manipulator robot tool as claimed in claim 8, wherein the quick release connection is a lash cleat.

10. A manipulator robot tool for picking up and moving objects, said tool comprising a body to which are fitted attachments for gripping said objects, elongated support members which carry said attachments, and slides inserted between said body and said elongated support members, said slides parallel to one another and comprising fixed rails connected to said body, each fixed rail comprising assembly means for accommodating a mobile rail and located in an upper part of each of said elongated support members, the tool further comprising means for quickly connecting each elongated support member to said body; and
wherein at least one elongated support member comprises, on sides thereof, orifices placed at each upper end thereof for storing the elongated support member by hooking on horizontal support arms, and the elongated support member further comprising handles placed between said hooking orifices to facilitate handling thereof.

11. A manipulator robot tool for picking up and moving objects, comprising:
a body;
elongated support members comprising gripping attachments configured to grip the objects;
slides disposed between the body and respective ones of the elongated support members, each slide comprising a fixed rail connected to the body and a mobile rail connected to a corresponding elongated support member, the mobile rail configured to be coupled to and to slide, together with the corresponding elongated support member, relative to the fixed rail;
a quick release coupling for each elongated support member that couples the elongated support member to the body; the quick release coupling comprising a heel placed at a back of the fixed rail, the heel forming a stop for the corresponding mobile rail and, at a front of the fixed rail, a coupling between the fixed rail and the corresponding elongated support member that allows quick release of the elongated support member.

12. The manipulator robot tool according to claim 11, wherein the slides are arranged parallel to one another.

13. The manipulator robot tool according to claim 11, wherein the coupling between the fixed rail and the corresponding elongated support member comprises a lash cleat.

14. The manipulator robot tool according to claim 11, wherein each of the gripping attachments comprises a bell-shaped, pneumatically actuated head, and wherein each elongated support member comprises compressed air supply lines that supply compressed air to the gripping attachments associated with the elongated support member, the supply lines connected to a compressed air source via a coupling on a back of the elongated support member.

15. The manipulator robot tool according to claim 11, wherein the gripping attachments are suckers disposed at a lower part of the elongated support members.

16. The manipulator robot tool according to claim 11, wherein at least one elongated support member comprises, on a side thereof, orifices for storing the elongated support member by hooking on horizontal support arms, and wherein the elongated support member further comprises handles placed between said hooking orifices, to facilitate handling thereof.

* * * * *